US006181460B1

(12) United States Patent
Tran et al.

(10) Patent No.: US 6,181,460 B1
(45) Date of Patent: Jan. 30, 2001

(54) ELECTROMAGNETIC FORCE CONTROLLED MICROMIRROR ARRAY

(75) Inventors: Dean Tran, Westminster; Edward A. Rezek, Torrance; Eric R. Anderson, Redondo Beach; William L. Jones, Inglewood, all of CA (US)

(73) Assignee: TRW Inc., Redondo Beach, CA (US)

(*) Notice: Under 35 U.S.C. 154(b), the term of this patent shall be extended for 0 days.

(21) Appl. No.: 09/195,534

(22) Filed: Nov. 18, 1998

(51) Int. Cl.[7] ................................................. G02B 26/00
(52) U.S. Cl. .................. 359/291; 359/290; 359/221; 359/224; 359/281; 438/52; 257/415
(58) Field of Search .................. 359/290, 291, 359/298, 221, 224, 230, 280, 281; 438/52, 72; 257/415, 417, 421, 659

(56) References Cited

U.S. PATENT DOCUMENTS

| | | | |
|---|---|---|---|
| 5,488,240 | 1/1996 | Hlousek et al. | 250/231.16 |
| 5,629,918 | 5/1997 | Ho et al. | 369/112 |
| 5,898,515 | * 4/1999 | Furlani et al. | 359/290 |
| 5,910,856 | * 6/1999 | Ghosh et al. | 359/291 |
| 6,071,752 | * 6/2000 | Furlani et al. | 438/52 |

OTHER PUBLICATIONS

Judy, Jack W. and Muller, Richard S., "Magnetically Actuated, Addressable Microstructures," Sep. 1997, *Journal of Microelectromechanical Systems*, vol. 6, No. 3, pp. 249–256.

Miller, Raanan A.; Burr, Geoffrey W.; Tai, Yu–Chong and Psaltis, Demetri, "A Magnetically Actuated MEMS Scanning Mirror," Jan., 1996, *SPIE*, vol. 2687, pp. 47–52.

Liu, Chang; Tsao, Tom; Tai, Yu–Chong and Ho, Chih–Ming, "Surface Micromachined Magnetic Actuators," 1994, *IEEE* Jan. 1994, pp. 57–62.

Wagner, B. and Benecke, W., "Microfabricated Actuator With Moving Permanent Magnet," 1991, *IEEE* Jan. 1991, pp. 27–32.

* cited by examiner

*Primary Examiner*—Loha Ben
(74) *Attorney, Agent, or Firm*—Michael S. Yatsko

(57) ABSTRACT

A micromirror device (10) is provided with a rotatable optical component (22) for use in a digital image processing application. The micromirror device (10) includes a semiconductor wafer (12), having a recess (14) formed therein, and a platform (20) with the optical component (22) deposited thereon that is movably coupled to the side surface of the recess (14). A first magnetic field source (24) is disposed around the periphery of the optical component (22) on the platform (20) and a second magnetic field source (26) is disposed proximate to this first magnetic field source (24), such that these magnetic field sources are selectively activatable to generate an electromagnetic field for rotating the platform (20). More specifically, the second magnetic field source (26) is disposed on the angular side surfaces of the recess (14) or adjacent to the recess (14) on a top surface of the wafer (12). A magnetic strip (30) may optionally be disposed on the bottom surface of the recess (14) for concentrating the electromagnetic field.

12 Claims, 7 Drawing Sheets

ELECTROMAGNETIC FORCE CONTROLLED MICROMIRROR ARRAY

BACKGROUND OF THE INVENTION

1. Field of the Invention

This invention relates generally to a microelectromechanical system and, more particularly, to an electromagnetic force controlled micromirror array system.

2. Discussion of the Related Art

A reflective, spatial light modulator composed of an array of rotatable aluminum mirrors has shown promise as an alternative to LCD technology for high-definition projection television systems. This modulator, commonly referred to as a digital micromirror device (DMD), is an advanced microelectromechanical system (MEMS). Generally, surface micromachining technology provides the primary means of fabrication for an array of micromirror devices which are built over conventional static random access memory (SRAM) address circuitry.

More particularly, DMD technology involves depositing an x-y grid array of aluminum micromirrors on one silicon wafer, such that each micromirror represents one pixel of the projection screen resolution. Each micromirror is electronically controlled to allow the mirror to tilt either up or down via a congruent, electronically addressed, x-y grid array of SRAM cells. A micromirror is suspended by metal posts above an individual SRAM cell and a metal hinge is used for connecting each micromirror to its corresponding metal post.

The micromirrors rotate due to electrostatic forces created between the aluminum micromirror and a corresponding metal electrode being formed on the wafer and connected to the SRAM cells. For example, when a SRAM cell receives a "1" voltage, its corresponding micromirror will deflect or twist around the hinge, thereby tilting the mirror closed and changing the direction of reflected light. This same mirror will remain closed until the same SRAM cell receives a "0" voltage which in turn twists the mirror in the opposite direction around the hinge, thus reflecting light in the opposite direction. Light reflected from the micromirror array is projected onto a field projection screen system which differentiates light tilted in one direction as compared to light tilted in the other direction, thereby producing a high resolution digital image.

Although DMD technology has recently achieved digital resolutions of 2048×1152 micromirrors, this technology continues to exhibit some disadvantages. For instance, the response time needed for an electrostatic charge to develop between the micromirror and the electrode of the SRAM cell decreases performance for actuating an electrostatic micromirror. In addition, the friction between the metal micromirror and the electrode may cause the micromirror to "stick" closed when the voltage is no longer applied, thereby causing an electronically addressed pixel to fail to open. Moreover, the DC voltage required to develop the electrostatic force for micromirror tilting also makes existing micromirror systems unsuitable for high frequency optical projection switching applications.

Therefore, it is desirable to provide a micromirror device for use in digital image processing applications. An optical component is deposited on a rotatably actuated platform positioned over a recess formed in a semiconductor wafer. The micromirror device structure exposes the rotatable platform to a substantially uniform magnetic field that improves control of the optical component over a wider deflection angle. Additionally, these micromirror devices are manufactured using standard semiconductor fabrication techniques.

SUMMARY OF THE INVENTION

In accordance with the teachings of the present invention, a micromirror device including a rotatable optical component is provided for use in a digital image processing application. The micromirror device includes a semiconductor wafer, having a recess formed therein, and a platform with the optical component deposited thereon that is movably coupled to the side surface of the recess. A first magnetic field source is disposed around the periphery of the optical component on the platform and a second magnetic field source is disposed proximate to this first magnetic field source, such that these magnetic field sources are selectively activatable to generate an electromagnetic field for rotating the platform. More specifically, the second magnetic field source is disposed on the angular side surfaces of the recess or adjacent to the recess on a top surface of the wafer.

BRIEF DESCRIPTION OF THE DRAWINGS

Other objects and advantages of the present invention will be apparent to those skilled in the art upon reading the following detailed description and upon reference to the drawings in which.

DETAILED DESCRIPTION OF THE PREFERRED EMBODIMENTS

While the invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Figure 1:
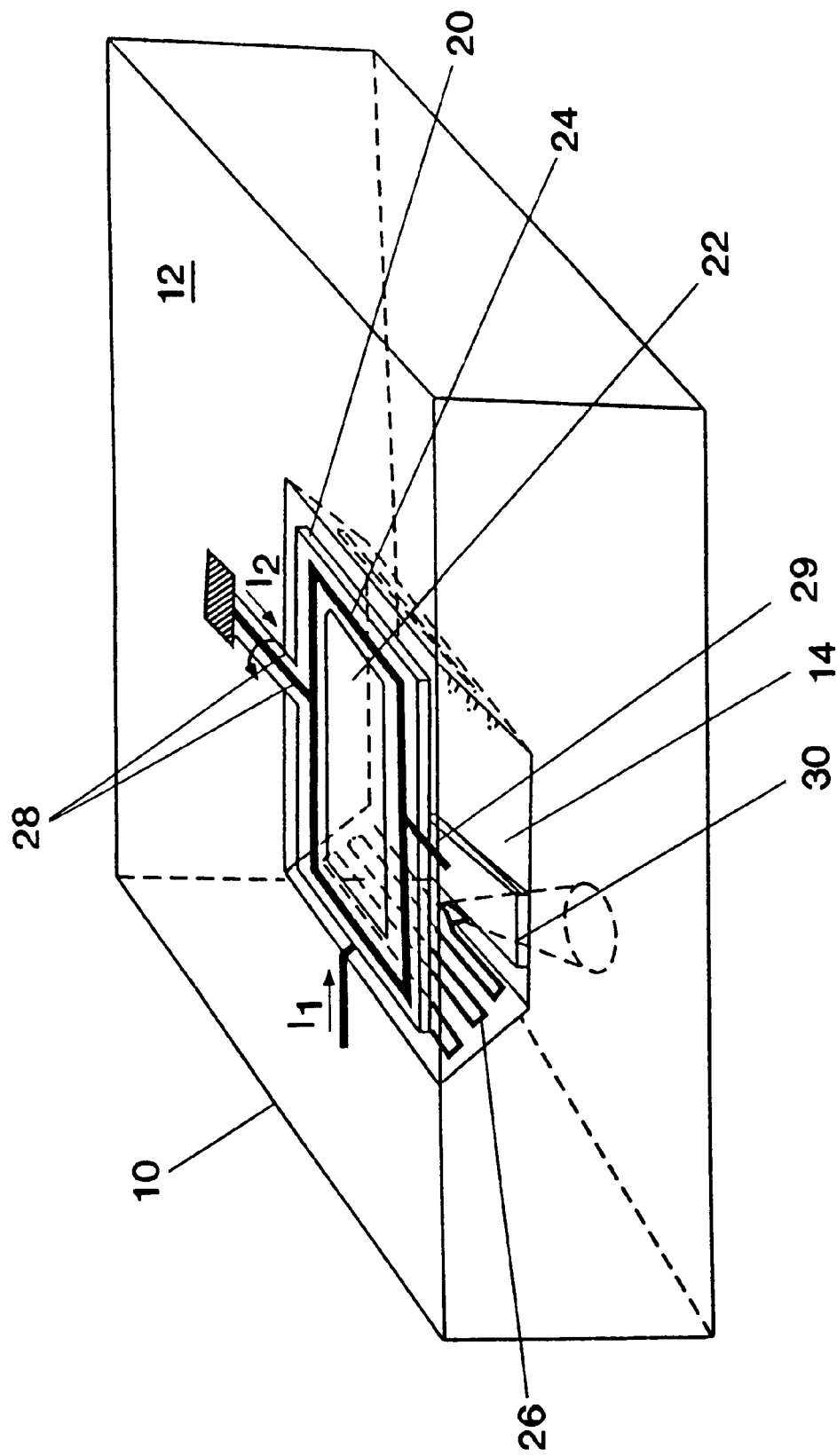
FIG. 1 is a perspective view of a first preferred embodiment of a micromirror device of the present invention.

A micromirror device 10 for use in a digital image processing application is illustrated in FIG. 1. A thin film dielectrical platform 20 is positioned over a recess 14 which has been formed on the top surface of a semiconductor wafer 12. An optical component 22, such as a mirror or other reflective member, is disposed onto the top surface of platform 20. A first magnetic field source 24 (also referred to as the primary magnetic field source) is also disposed around the periphery of optical component 22. To facilitate axial rotation of optical component 22, platform 20 is movably attached by a first hinge 28 and a second hinge 29 to opposing side surfaces of recess 14. Lastly, a second magnetic field source 26 (also referred to as the secondary magnetic field source) is disposed adjacent to recess 14 along the angular surface of wafer 12.

Platform 20 is rotated about its axis using an electromagnetic force generated between first and second magnetic field source 24 and 26, respectively. First magnetic field source 24 and second magnetic field source 26 are each generally comprised of a current source being connected to a conductive coil. Preferably, these magnetic field sources are selectively activatable by an electrical current running through its conductive coils. Because a current is used to energize the coils of the first magnetic field source 24 and the second magnetic field source 26, the micromirror device 10 of the present invention can be actuated faster than conventional devices. As will be apparent to one skilled in the art, an increase in the number of windings in a conductive coil for either the first magnetic field source 24 or the second magnetic field source 26 will increase the strength of the magnetic field. It is envisioned that other magnetic field elements, such as a permanent magnetic material, may also be used to generate these magnetic field forces.

A magnetic strip 30 is optionally provided along the bottom surface of recess 14. This magnetic strip 30 concentrates the magnetic energy between the first and second magnetic field sources 24 and 26 which in turn helps to reduce current needs as well as to prevent wasting magnetic flux energy within the device. Furthermore, a third magnetic field source (not shown) could be disposed along the top surface of wafer 12 (opposite to the second magnetic field source) to further enhance the control of actuating platform 20.

Figure 2A:
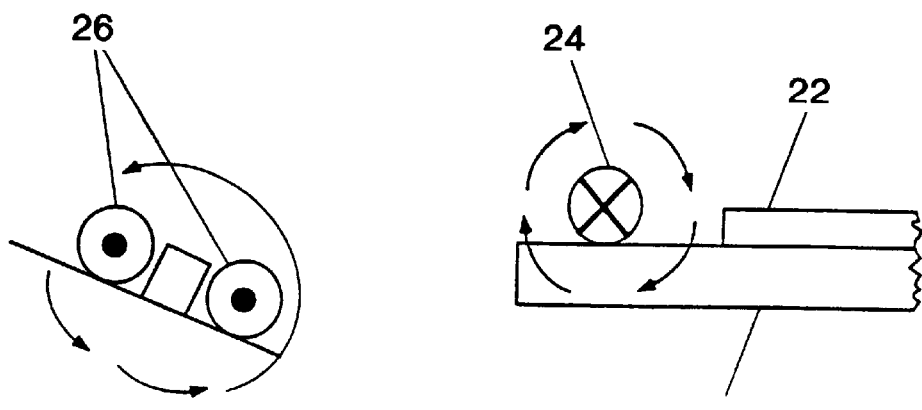
FIGS. 2A–2C are fragmentary side views showing an electromagnetic field between a first conductive coil and a second conductive coil that causes axial rotation of the micromirror device of the present invention.
Figure 2B:
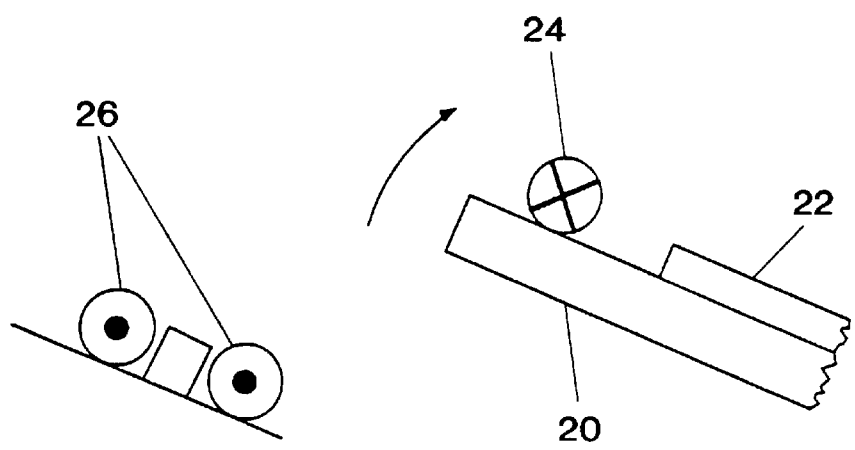
Figure 2C:
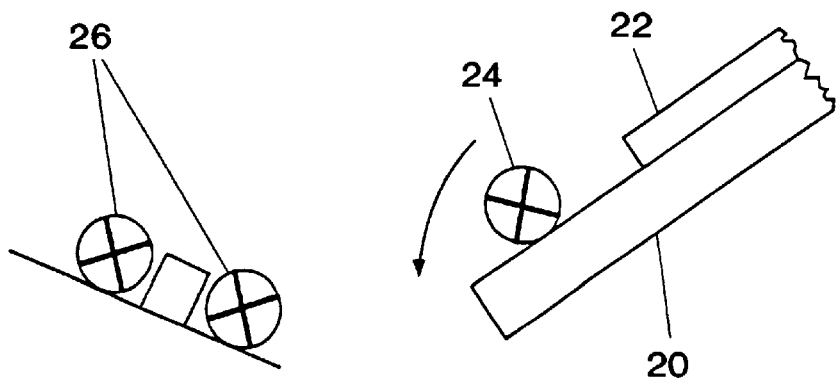

Micromirror device 10 controls the rotation of platform 20 via the current flow in the inductive coils as shown in FIGS. 2A–2C. When the current flowing in the first magnetic field source 24 is in the opposite direction of the current flowing in the second magnetic field source 26, as seen in FIG. 2A, the generated electromagnetic field causes the two magnetic field sources to repel. In FIG. 2B, platform 20 is actively "pushed" or rotated away from the second magnetic field source 26. On the other hand, if the current in each of the magnetic field sources 24 and 26 flows in the same direction, then the electromagnetic field creates an attractive force between the two magnetic field sources. In FIG. 2C, platform 20 is being "pulled" back towards the second magnetic field source 26. Unlike some of the conventional electrostatic controlled micromirror devices, the present invention has an active attraction force that returns platform 20 to its initial planar position. Although the direction of current flow in the above discussion has been changed in the first magnetic field source 24, it is envisioned that actuation of platform 20 can be accomplished by changing the direction of current flow in either one of the magnetic field sources.

Typically, rotation of platform 20 is +/−10 degrees from the parallel plane of the top surface of wafer 12. Micromirror device 10, in accordance with the present invention, provides better rotational control over a wider deflection angle than a convention electrostatic "flap type" micromirror device. The platform 20 is exposed to a concentrated magnetic field generated between the first and second magnetic field sources 24 and 26. Therefore, the platform 20 rotates within a substantially uniform magnetic field, whereas the mirror of a conventional flap type device is deflected away from its electrostatic source. As a result, the present invention provides a quicker and substantially linear response to changes in the magnetic field forces. To further assist in achieving this uniform magnetic field effect, current flows in the same direction on each side of the platform 20. In other words, between each hinge the current flows in parallel circuit paths as provided by the conductive coils of the first magnetic field source 24.

Figure 3:
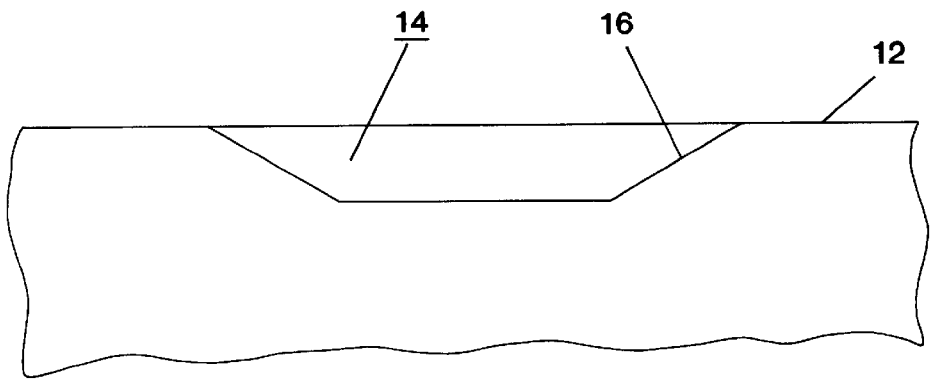
FIG. 3 is a side view of the micromirror device illustrating the etching of a recess into a semiconductor wafer in accordance with the present invention.

Generally, the micromirror device 10 of the present invention is manufactured using standard semiconductor fabrication techniques. The following description of a fabrication process is merely exemplary in nature and is in no way intended to limit the broader aspects of the micromirror device 10 of the present invention. This description, as well as related FIGS. 3–10, will use reference numbers from FIG. 1 to reference, where appropriate, corresponding elements from micromirror device 10. As seen in FIG. 3, the recess 14 is etched into the semiconductor wafer 12 (i.e., an insulating InP substrate). An oriented chemical etchant (e.g., HCl:H3PO4:H2O) is used to etch 20–50 micrometers into the substrate, thus forming the recess 14 with four angular side walls 16.

Figure 4A:
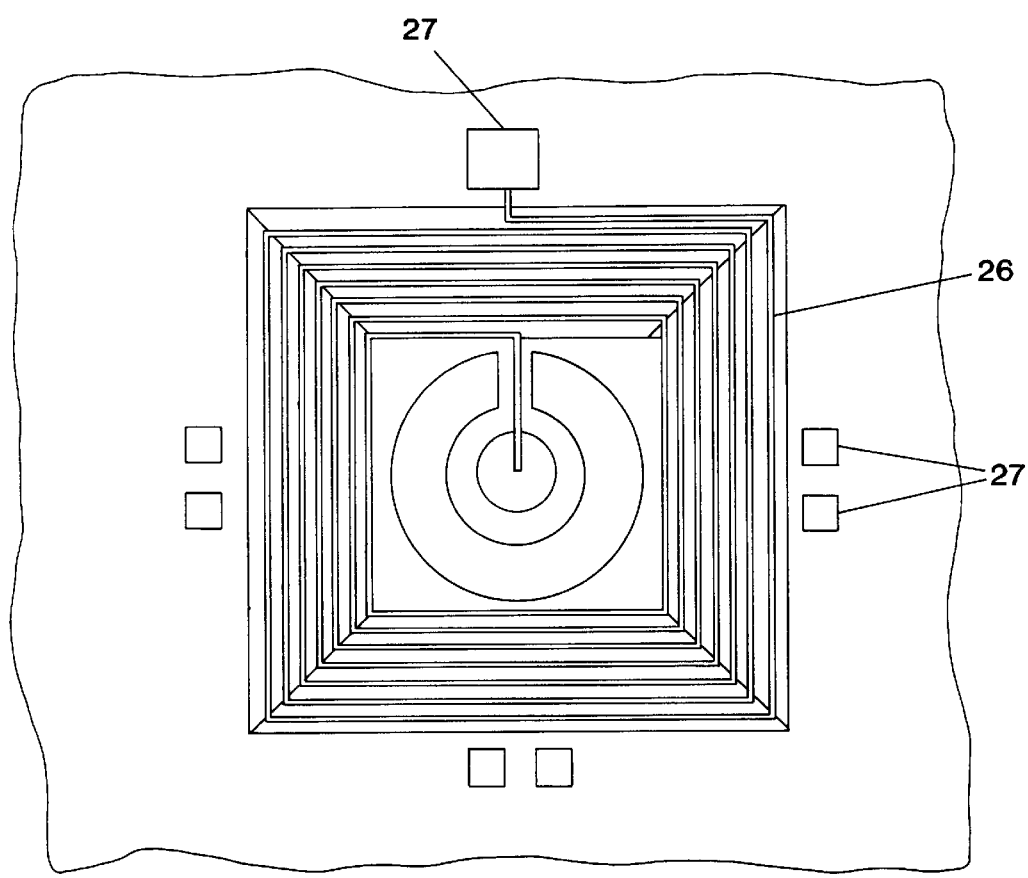
FIGS. 4A and 4B are a top view and side view, respectively, of the micromirror device illustrating the formation of a primary magnetic field source in accordance with the present invention.
Figure 4B:
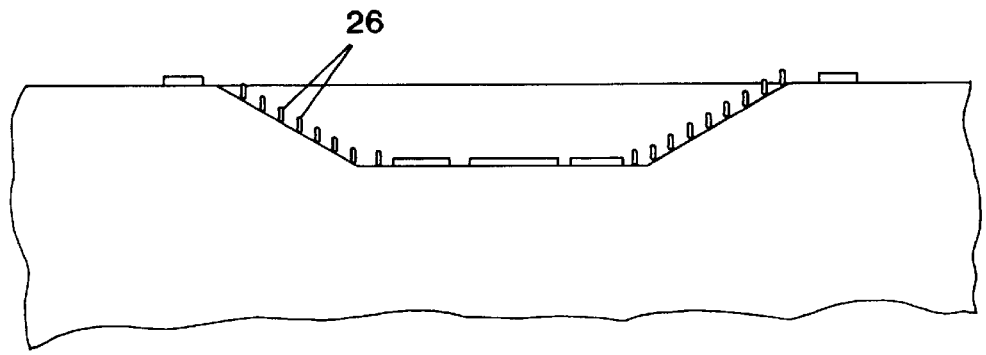

Formation of the primary magnetic field source 26 is shown in association with FIGS. 4A and 4B. Using well known photolithography techniques, the conductive coils of the primary magnetic field source 26 are deposited either along the angular side surfaces 16 of recess 14 (as shown) or adjacent to recess 14 on a top surface of the wafer 12. A photoresist mask is placed on the appropriate surface of the recess 14, leaving exposed those regions that correspond to magnetic field source 26 and various contact areas 27. Next, the entire surface is coated with an evaporated metal (e.g., TiPtAu or CrNiAu). Using a liftoff technique, the photoresist and selective portions of the metal are dissolved by a suitable solvent, thereby leaving a metallic pattern as the basis for magnetic field source 26. Similar photolithography techniques are then used to apply a thicker metal plating layer (e.g., 3 to 10 micrometers of Au) to the top surface of the existing magnetic field source. In addition, an aluminum plating layer may be sputtered onto the top surface of the contact areas.

Figure 5:
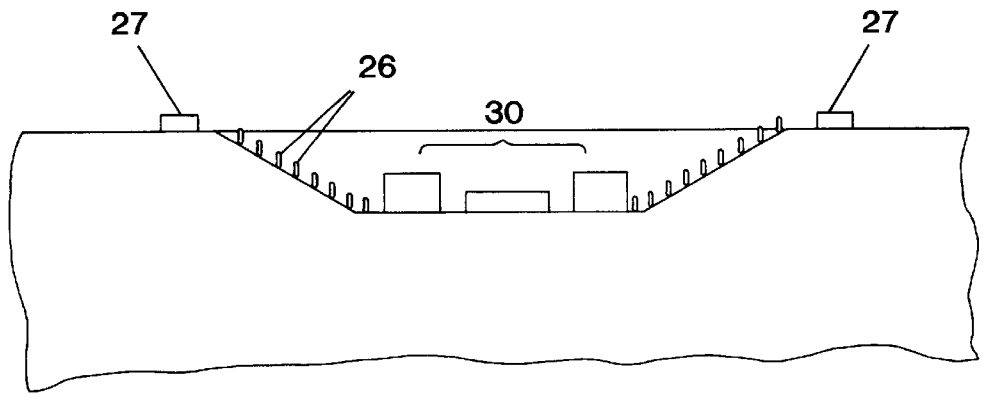
FIG. 5 is a side view of the micromirror device illustrating the formation of a magnetic ring in accordance with the present invention.

Referring to FIG. 5, the magnetic strip 30 or magnetic ring may optionally be deposited onto the bottom surface of the recess 14 via sputtering or an ultra-violet laser induced chemical vapor deposition process or plating process. Magnetic strip 30 may be comprised of Iron (Fe), Iron Cobalt (FeCo), Iron Nickel Cobalt (FeNiCo) or other ferromagnetic materials as is known in the art. Rather than applying this magnetic material onto the bottom surface of the recess 14, it could be deposited onto a top surface of a metallic layer which has been formed using the above-described photolithography techniques.

Figure 6:
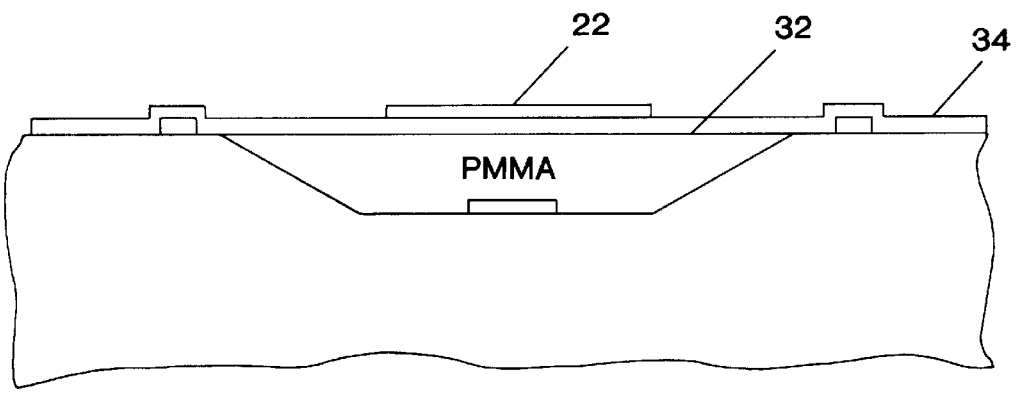
FIGS. 6–8 are views of the micromirror device illustrating the formation a platform in accordance with the present invention.
Figure 7:
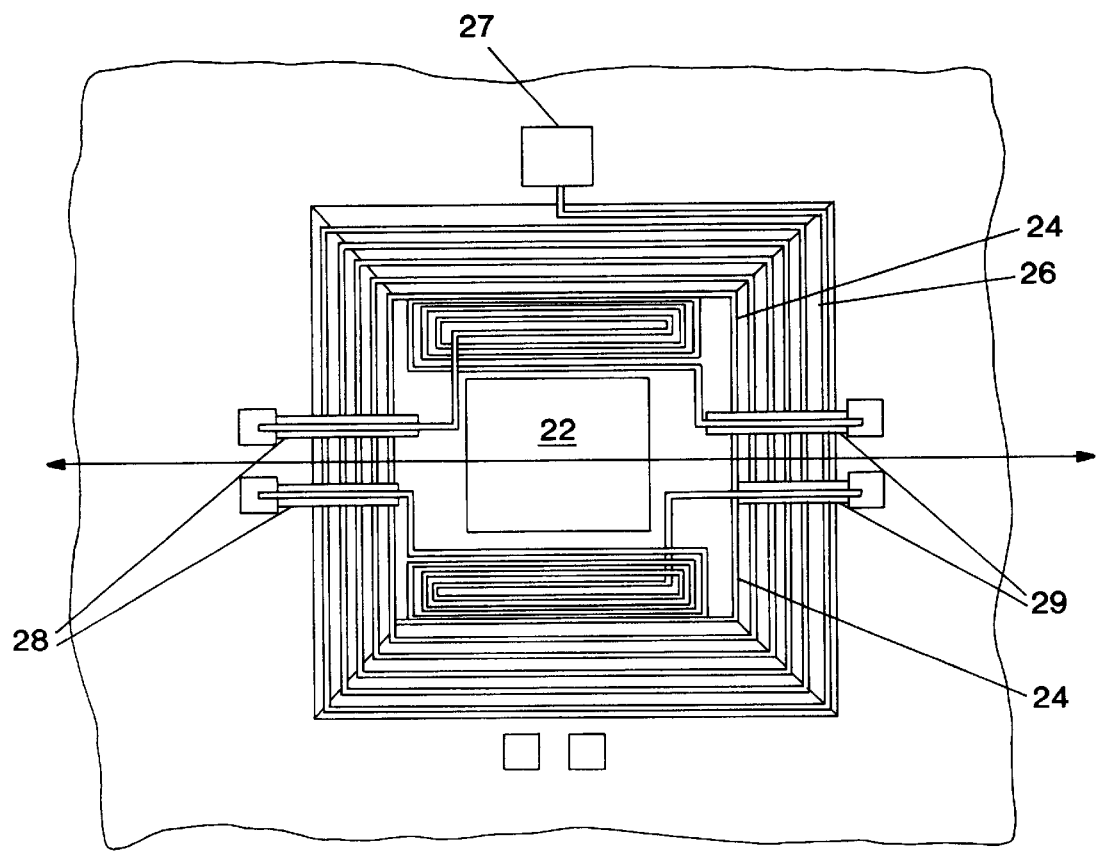
Figure 8:
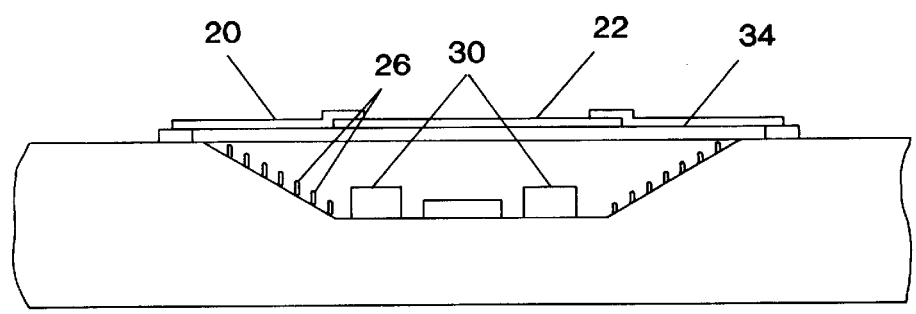

Formation of platform 20 for the micromirror device 10 is depicted in FIGS. 6–8. First, the recess 14 is planarized using, for example, a polymethylmethacrylate (PMMA) material or other planarizing dielectric material. A passivation layer 34 (e.g., silicon nitride/silicon dioxide or other polysilicon material) is then applied onto the top surface of the planarized layer 32 and serves as the basis for platform 20. Next, the optical component 22 and two secondary magnetic field sources 24 are formed onto the top surface of this passivation layer 34 using similar photolithography techniques as previously described in conjunction with primary magnetic field source 26. Secondary magnetic field source 24 should be positioned around the periphery of the optical component 22 as shown in FIG. 7. Since the coil has not been integrated with the optical component 22, the present invention provides an optical component with a substantially planar surface that exhibits higher quality reflective characteristics. Using wet or dry etching, first hinge 28 and second hinge 29 are formed by selectively removing passivation material. Lastly, planarized material is removed by soaking the wafer 12 in a chlorobenzene solution or equivalent cleaning solution, thereby defining the suspended platform 20, shown in FIG. 8.

Figure 9:
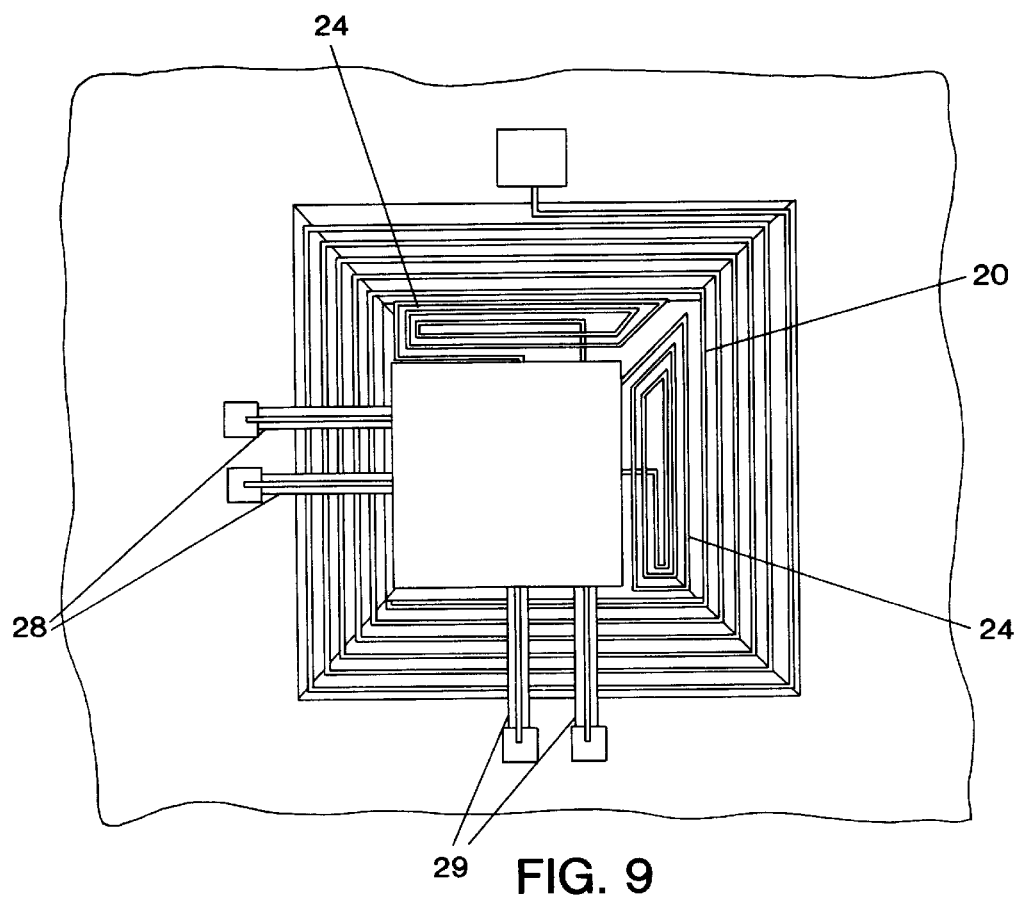
FIG. 9 is a top view of an alternative embodiment of a micromirror device which allows for three-dimensional platform motion.

An alternative embodiment of a micromirror device 36 is depicted in FIG. 9. This device allows for three-dimensional movement of the platform 20 by positioning each of its two hinges 28 and 29 on adjacent sides of the platform. In addition, two secondary magnetic field sources 24 are disposed on adjacent sides of the platform, but on opposite sides from the two hinges 28 and 29. In this way, platform 20 may be actuated along either (or both) of an x-axis or a y-axis through the use of these selectively activatable secondary magnetic field sources 24. This alternative device otherwise operates and is fabricated as previously described.

Figure 10:
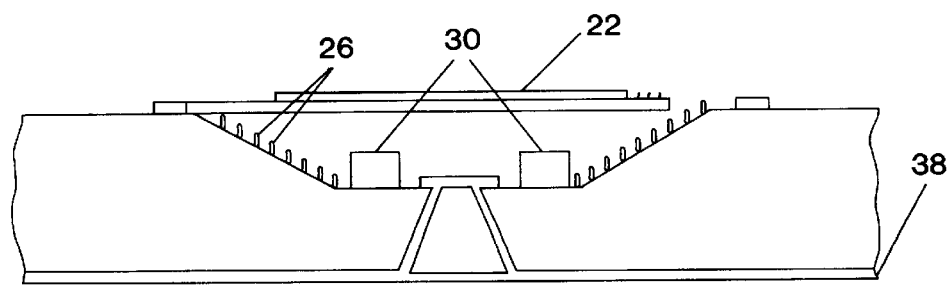
FIG. 10 is a side view of the micromirror device illustrating backside fabrication in accordance with the present invention.

In FIG. 10, some additional backside fabrication completes either of the above-described devices. Once the bottom surface of the wafer 12 has been polished, a hole 37 is etched into the bottom surface of the wafer 12 until a center contact for primary magnetic field source 26 is reached. A metal coating 38 is also applied to the bottom surface as a means for establishing an electrical connection between the primary magnetic field source 26 and any addressing means used by the device 10. The metal coating 38 may be comprised of a plated layer of evaporated or sputtered TiPtAu or CrNiAu which may in turn be covered with a thicker layer of Au. One skilled in the art will readily recognize from these discussions that other semiconductor fabrication techniques may also be used to form a micromirror device 10 of the present invention.

Figure 11:
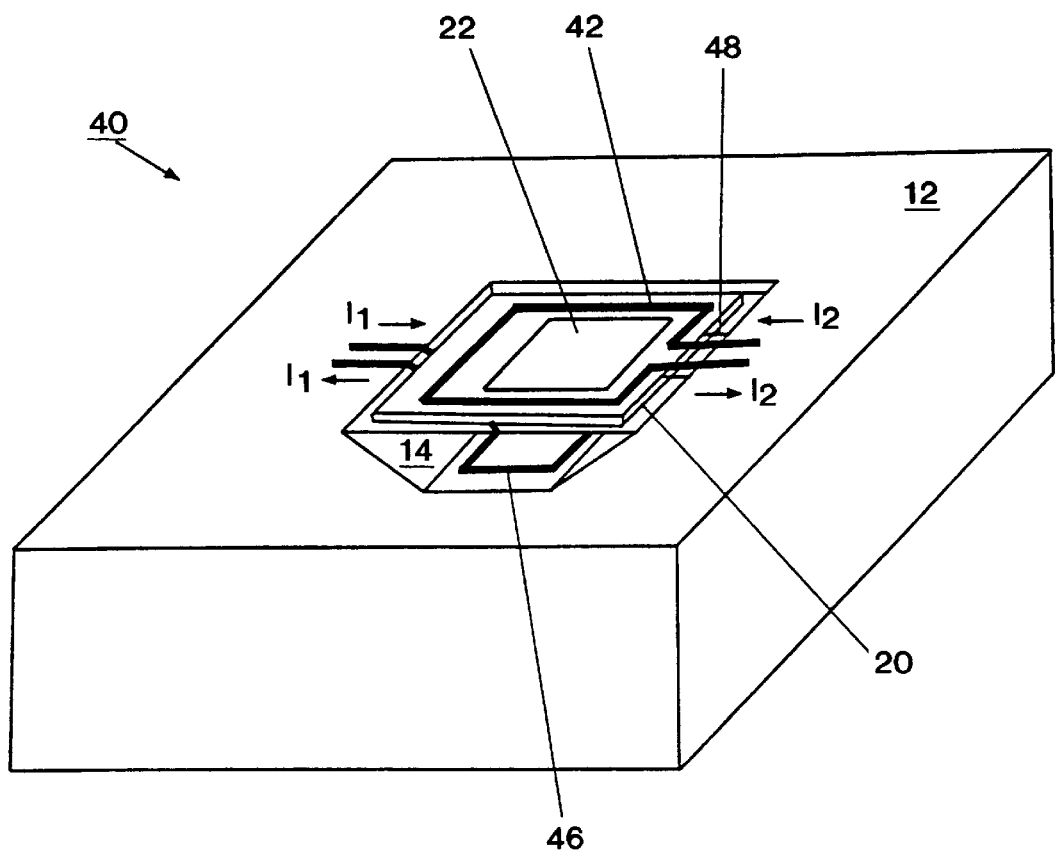
FIG. 11 is a perspective view of a second alternate embodiment of a micromirror device in accordance with the present invention.

A second preferred embodiment of a micromirror device 40 is illustrated in FIG. 11. The micromachined platform 20, including optical component 22 and a first magnetic field source 42 coupled thereto, is similarly positioned over the recess 14 which has been defined in semiconductor wafer 12. However, a second magnetic field source 46 is disposed along the bottom surface of recess 14, rather than being disposed adjacent to recess 14 as seen in FIG. 1. Moreover, platform 20 is coupled by only a single hinge 48 to the side surfaces of recess 14. Micromirror device 40 otherwise includes all of the basic components (and variations) as discussed in relation to the device of FIG. 1.

In operation, single hinge 48 accommodates flap-type actuation of platform 20. Unlike the first embodiment from FIG. 1, the conductive coil of first magnetic field source 42 forms a single current path along the periphery of optical component 22. Upon activation of first magnetic field source 42 and second magnetic field source 46, a magnetic field perpendicular to the bottom surface of recess 14 causes deflection of, or a pivoting motion, of platform 20 outwardly from the recess 14. Again, the direction of current flow in either of the two coils can be reversed to create an opposite attractive magnetic force between the first and second magnetic field sources 42 and 46, respectively.

A plurality of micromirror devices from either of the above-described embodiments can be arranged to form an electronically addressable micromirror array. Each micromirror device is suspended above an individual static random access memory (SRAM) cell, such that a plurality of micromirror devices and SRAM cells construct an x-y array. This underlying SRAM control arrangement is generally comprised of a conventional six transistor circuit or storage cell that is fabricated using a CMOS double-level metallization process. As will be apparent to one skilled in the art, various SRAM control arrangements may be integrated with micromirror devices of the present invention to form a micromirror array.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A micromirror device for use in a digital image processor, comprising:

a substrate having a recess formed therein;

a platform rotatably attached to said substrate;

an optical element deposited on said platform;

a first magnetic field source deposited on said platform; and a second magnetic field source disposed proximate to said platform, said first and second magnetic field sources being selectively activatable to generate an electromagnetic field for actuating said platform.

2. The micromirror device of claim 1 wherein said first magnetic field source is disposed substantially around the periphery of said optical element on said platform.

3. The micromirror device of claim 1 wherein said platform is rotatably coupled by at least one hinge to said substrate.

4. The micromirror device of claim 3 further comprising a third magnetic field source disposed across from said second magnetic field source on the top surface of said substrate.

5. The micromirror device of claim 1 wherein said second magnetic field source is disposed adjacent to said recess on a top surface of said substrate.

6. The micromirror device of claim 1 wherein said recess has a bottom surface and at least one angular side surface, said second magnetic field source being disposed on said angular side surface of said recess.

7. The micromirror device of claim 1 further comprising a magnetic element disposed on a bottom surface of said recess for concentrating the electromagnetic field.

8. The micromirror device of claim 1 wherein said optical element and said first magnetic field source are substantially planar on the surface of said platform.

9. The micromirror device of claim 1 wherein said first magnetic field source includes a first current source connected to a first conductive coil, and said second magnetic field source includes a second current source connected to a second conductive coil.

10. The micromirror device of claim 9 wherein at least one of said first and second conductive coils is further defined by a plurality of windings to increase the electromagnetic field.

11. The micromirror device of claim 9 wherein at least one of said first and second current sources regulates the direction of current flow, thereby controlling the direction of said electromagnetic field.

12. The micromirror device of claim 1 wherein said platform is pivotably coupled by a hinge to said substrate and said second magnetic field source is disposed on a bottom surface of said recess.

* * * * *